(12) United States Patent
Kim et al.

(10) Patent No.: US 9,516,707 B2
(45) Date of Patent: Dec. 6, 2016

(54) LED LIGHTING APPARATUS, CURRENT REGULATOR FOR THE LED LIGHTING APPARATUS, AND CURRENT REGULATION METHOD OF THE LED LIGHTING APPARATUS

(71) Applicant: SILICON WORKS CO., LTD., Daejeon-si (KR)

(72) Inventors: Yong Geun Kim, Suwon-si (KR); Sang Young Lee, Jeonju-si (KR); Gyeong Sik Mun, Daejeon-si (KR); Ki Chul An, Daegu-si (KR)

(73) Assignee: SILICON WORKS CO., LTD., Daejeon-Si (KR)

( * ) Notice: Subject to any disclaimer, the term of this patent is extended or adjusted under 35 U.S.C. 154(b) by 199 days.

(21) Appl. No.: 14/094,231

(22) Filed: Dec. 2, 2013

(65) Prior Publication Data

US 2014/0152183 A1    Jun. 5, 2014

(30) Foreign Application Priority Data

Nov. 30, 2012  (KR) .......................... 10-2012-0138281

(51) Int. Cl.
| | | |
|---|---|---|
| *H05B 37/02* | (2006.01) | |
| *H05B 39/04* | (2006.01) | |
| *H05B 41/36* | (2006.01) | |
| *H05B 33/08* | (2006.01) | |

(52) U.S. Cl.
CPC ...... *H05B 33/0809* (2013.01); *H05B 33/0815* (2013.01); *H05B 33/0818* (2013.01); *H05B 33/0848* (2013.01); *H05B 33/0854* (2013.01); *H05B 37/0263* (2013.01); *Y02B 20/347* (2013.01)

(58) Field of Classification Search
USPC ................................................... 315/149–159
See application file for complete search history.

(56) References Cited

U.S. PATENT DOCUMENTS

7,358,679 B2 * 4/2008 Lys .................... H05B 33/0815
                                                                315/291
7,936,132 B2    5/2011  Quek et al.
(Continued)

FOREIGN PATENT DOCUMENTS

KR    10-2011-0017784    2/2011
KR    10-2011-0060053    6/2011
(Continued)

*Primary Examiner* — Brandon S Cole
(74) *Attorney, Agent, or Firm* — Kile Park Reed & Houtteman PLLC

(57) ABSTRACT

The present invention discloses an LED lighting apparatus. The LED lighting apparatus includes a converter for transforming rectified voltage in accordance with a switching operation according to a driving pulse and outputting the transformed voltage, a current regulator for generating the driving pulse having a pulse width varied in response to a control signal and the amount of current of the converter and switching the operation of the converter using the generated driving pulse, and a peripheral circuit module for providing the control signal for controlling the dimming of an LED lighting.

16 Claims, 5 Drawing Sheets

(56) References Cited

U.S. PATENT DOCUMENTS

| | | | |
|---|---|---|---|
| 8,222,832 B2* | 7/2012 | Zheng et al. | 315/291 |
| 2008/0278092 A1* | 11/2008 | Lys | H05B 33/0815 315/247 |
| 2009/0167187 A1* | 7/2009 | Kitagawa | H05B 33/0854 315/77 |
| 2010/0213857 A1* | 8/2010 | Fan | 315/186 |
| 2011/0193491 A1* | 8/2011 | Choutov et al. | 315/291 |
| 2011/0260645 A1* | 10/2011 | Chen | G09G 3/3406 315/294 |
| 2011/0266958 A1* | 11/2011 | Tsai | H05B 33/083 315/152 |
| 2011/0285301 A1* | 11/2011 | Kuang | H05B 33/0845 315/200 R |
| 2011/0291585 A1* | 12/2011 | Foo | H05B 33/0815 315/291 |
| 2012/0007512 A1* | 1/2012 | Kim | H05B 33/0827 315/152 |
| 2012/0169240 A1* | 7/2012 | Macfarlane | 315/152 |
| 2012/0242238 A1* | 9/2012 | Chen et al. | 315/200 R |
| 2013/0119867 A1* | 5/2013 | Yu et al. | 315/120 |
| 2013/0134893 A1* | 5/2013 | Zimmermann | H05B 33/0815 315/224 |
| 2013/0293119 A1* | 11/2013 | Averitt | H05B 41/2988 315/158 |
| 2013/0293151 A1* | 11/2013 | Puvanakijjakorn | H05B 33/0815 315/297 |
| 2014/0152183 A1* | 6/2014 | Kim et al. | 315/155 |
| 2016/0029455 A1* | 1/2016 | Aydin | H05B 33/0827 315/193 |

FOREIGN PATENT DOCUMENTS

| | | |
|---|---|---|
| KR | 10-1164631 | 7/2012 |
| KR | 10-2012-0114600 | 10/2012 |

\* cited by examiner

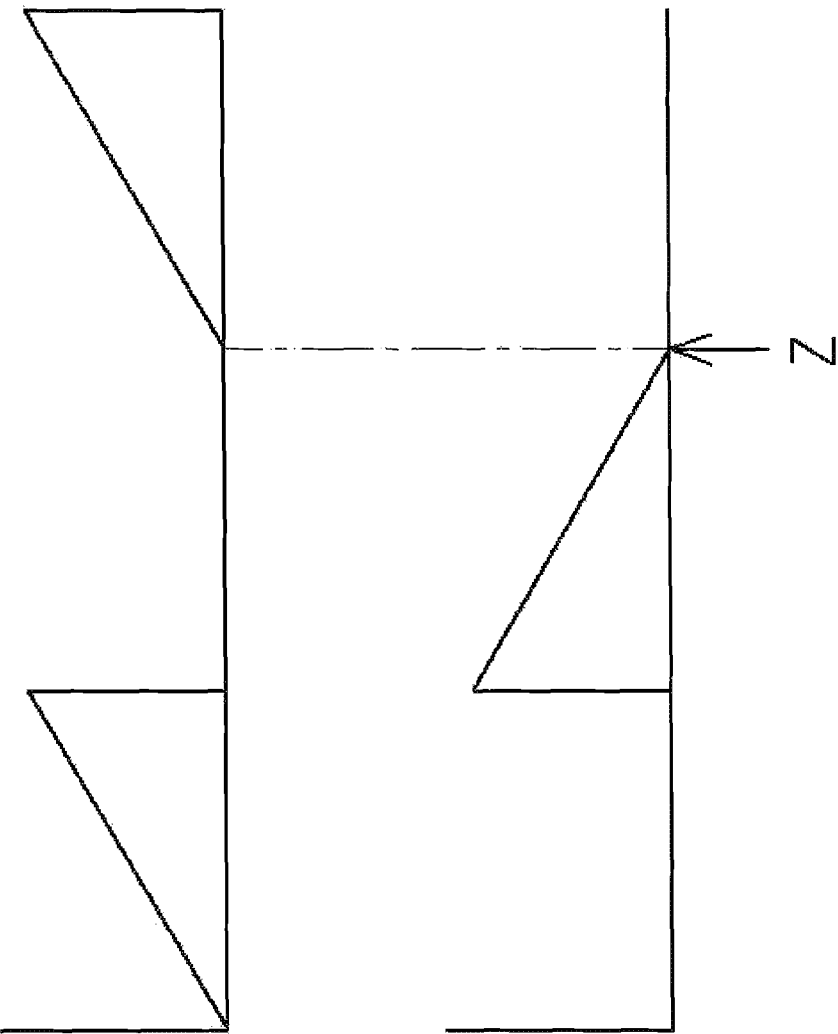

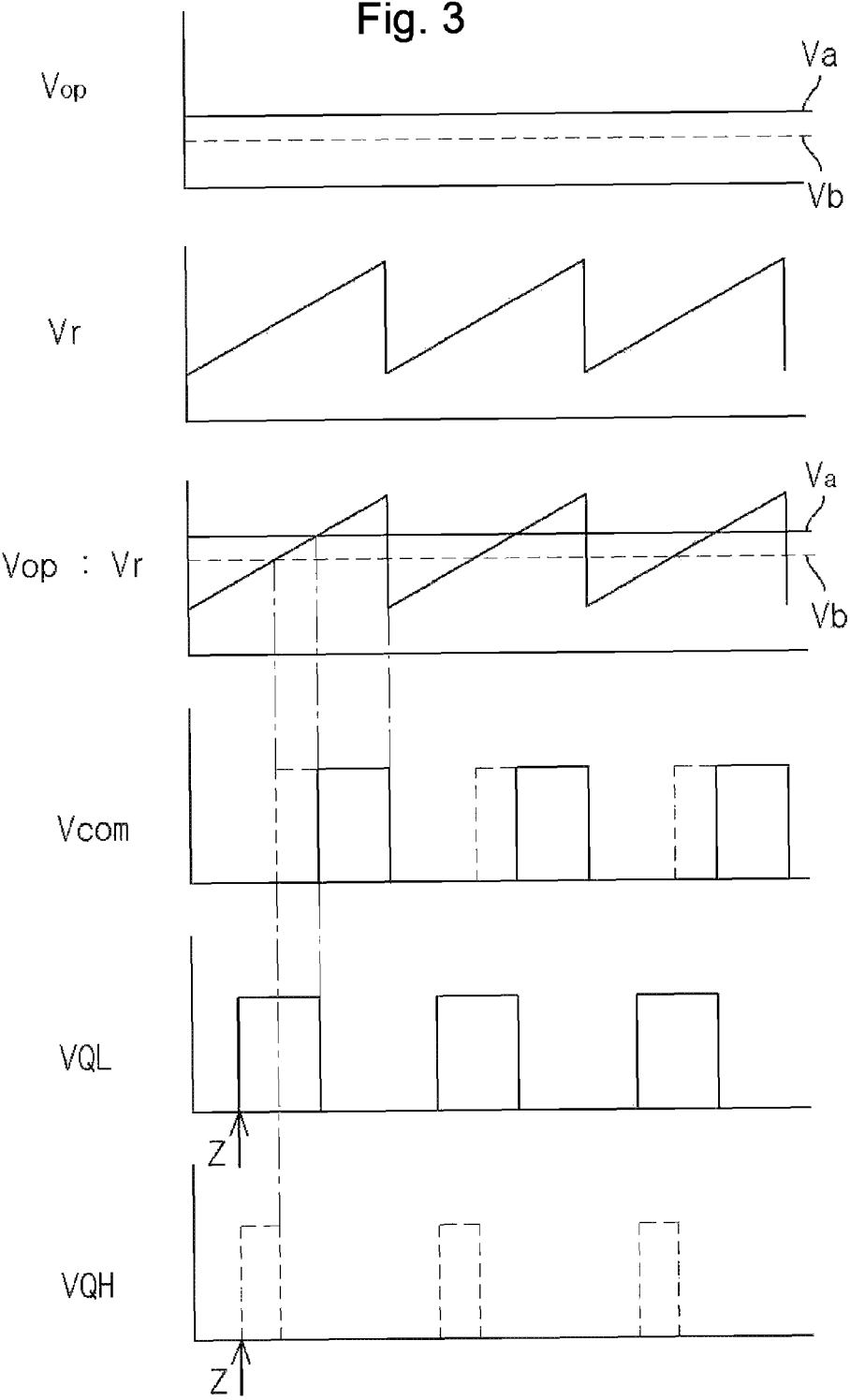

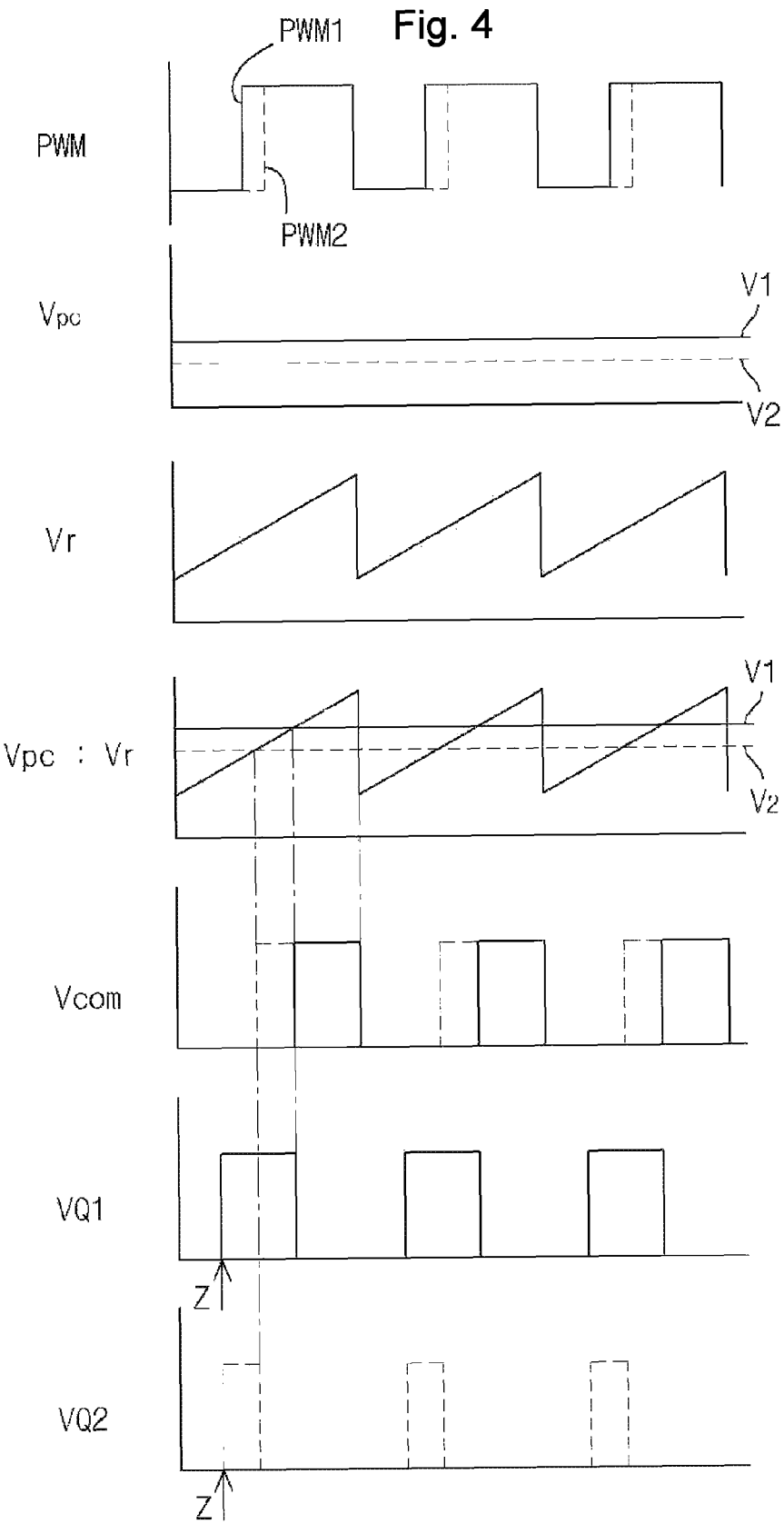

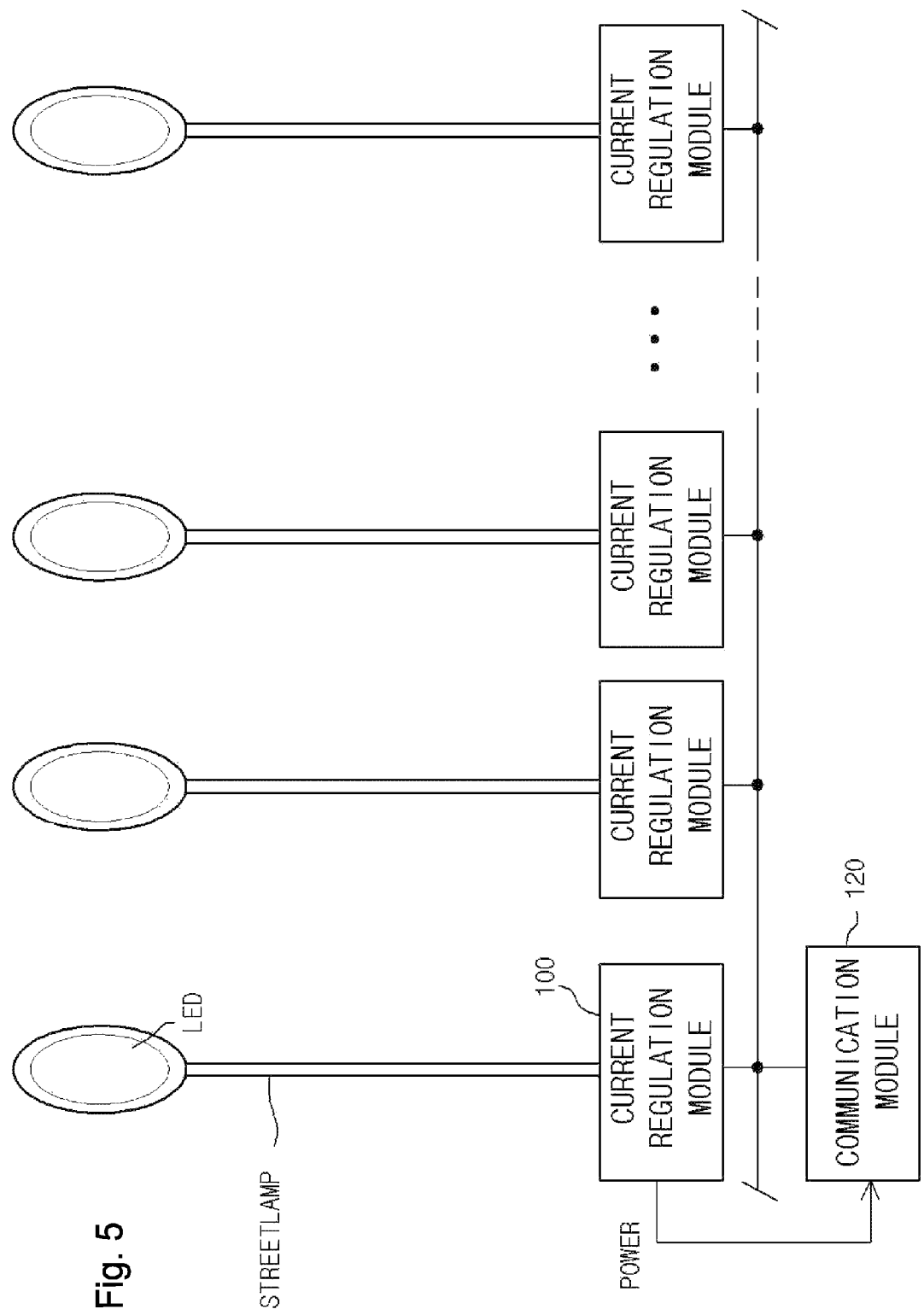

LED LIGHTING APPARATUS, CURRENT REGULATOR FOR THE LED LIGHTING APPARATUS, AND CURRENT REGULATION METHOD OF THE LED LIGHTING APPARATUS

BACKGROUND OF THE INVENTION

1. Field of the Invention

The present invention relates to a Light-Emitting Diode (hereinafter referred to as an 'LED') lighting apparatus, and more particularly, to an LED lighting apparatus having improved power efficiency, a current regulator for the LED lighting apparatus, and the current regulation method of the LED lighting apparatus.

2. Description of the Related Art

In recent lighting apparatuses, incandescent lights and fluorescent lights are being replaced with LEDs capable of being implemented to have a relatively longer lifespan, low consumption power, and high brightness as lighting lamps.

The lighting apparatus may include, for example, a security light and a streetlamp. An LED lighting apparatus that adopts an LED lighting is also developed as the security light or streetlamp and commercialized.

In general, a conventional LED lighting apparatus is implemented using a Switching Mode Power Supply (hereinafter referred to as an 'SMPS') module using a commercial AC power source.

An example of the conventional LED lighting apparatus configured as described above is disclosed in Korean Patent Registration No. 10-1164631. In this patent, a commercial AC power source supplies a power to LEDs through an SMPS module and a driving circuit.

A conventional LED lighting apparatus may further include a sensor board which includes a sensor for sensing illuminance or the human body for dimming control or switching control purposes. In such a case, the LED lighting apparatus is configured to supply a power to the sensor board through the SMPS module.

However, the conventional LED lighting apparatus is disadvantageous in that it has a complicated construction because the conventional LED lighting apparatus includes the SMPS module for supplying a power to an LED lighting and the driving circuit for driving LEDs using a current driving method.

Furthermore, in the conventional LED lighting apparatus, the SMPS module is designed to have power efficiency of about 90%, and the driving circuit is also designed to have power efficiency of about 90%. As a result, the conventional LED lighting apparatus is designed to have total efficiency of about 81%. As described above, the conventional LED lighting apparatus has a problem in that total power efficiency is reduced due to the complicated construction.

Furthermore, peripheral circuit modules, such as the sensor board, may be additionally configured in the LED lighting apparatus. In such a case, most of power is consumed by the driving circuit for driving LEDs.

Accordingly, the conventional LED lighting apparatus is problematic in that power efficiency for the additional peripheral circuit modules is low because most of power is consumed by the driving circuit for driving LEDs.

SUMMARY OF THE INVENTION

Accordingly, the present invention has been made in an effort to solve the problems occurring in the related art, and an object of the present invention is to provide an LED lighting apparatus capable of supplying a power for driving an LED lighting with high power efficiency, a current regulator for the LED lighting apparatus, and the current regulation method of the LED lighting apparatus.

Another object of the present invention is to provide an LED lighting apparatus having a simple structure and high power efficiency by supplying a power to an LED lighting and peripheral circuit modules, such as a sensor board and a communication module, in common using a current regulator, a current regulator for the LED lighting apparatus, and the current regulation method of the LED lighting apparatus.

Yet another object of the present invention is to provide an LED lighting apparatus capable of efficiently supplying a power to a peripheral circuit module, such as a communication module for controlling a plurality of LED lightings spaced apart from one another, such as security lights or streetlamps.

In order to achieve the above object, according to one aspect of the present invention, there is provided an LED lighting apparatus, including a converter for transforming rectified voltage in accordance with a switching operation according to a driving pulse and outputting the transformed voltage, a current regulator for generating the driving pulse having a pulse width varied in response to a control signal and the amount of current of the converter and switching the operation of the converter using the generated driving pulse, and a peripheral circuit module for providing the control signal for controlling the dimming of an LED lighting.

Furthermore, according to one aspect of the present invention, there is provided the current regulator of an LED lighting apparatus, including a switching element connected to a converter for converting a level of voltage and configured to switch the operation of the converter in response to a driving pulse, a feedback circuit configured to supply a first comparison terminal with a feedback signal corresponding to current that flows through the switching element, a dimming signal transfer circuit configured to externally receive a control signal for controlling the dimming of an LED lighting and to apply a dimming control signal corresponding to the control signal to the first comparison terminal, a reference signal generator configured to generate a reference pulse and to supply the reference pulse to the second comparison terminal, a first comparator configured to output a comparison signal obtained by comparing the signals of the first and the second comparison terminals with each other, and a driving circuit configured to supply the driving pulse to the switching element in response to the comparison signal.

Furthermore, according to one aspect of the present invention, there is provided the current regulation method of an LED lighting apparatus includes supplying, by a converter for converting a level of voltage through a switching element driven in response to a driving pulse, an LED lighting and one or more peripheral circuit modules with DC voltage, converted from rectified voltage, to as a power, detecting the current of the converter, applying a current control signal, obtained by comparing the current of the converter with a reference voltage, to a first comparison terminal, applying a dimming control signal, corresponding to a control signal received outside the LED lighting, to the first comparison terminal, generating a reference pulse and applying the reference pulse to the second comparison terminal, comparing the signals of the first and the second comparison terminals with each other and outputting a result of the comparison as a comparison signal, and outputting the driving pulse using a Zero Current Detection signal obtained by detecting a zero crossing point of the current of the converter as a set signal and the comparison signal as a reset signal.

The current regulation method may further include supplying the first comparison terminal with the dimming control signal corresponding to the externally received control signal in order to control the dimming of the LED lighting.

Furthermore, according to another aspect of the present invention, there is provided an LED lighting apparatus, including a plurality of LED lightings spaced apart from one another, a current regulation module installed in each of the LED lightings and configured to generate a driving pulse having a pulse width varied in response to an external control signal and the amount of current of a converter for converting a level of voltage and to supply the LED lighting with a power through the converter driven in response to the driving pulse, and a communication module configured to receive the power, provided to the LED lighting, from one of the current regulation modules and to provide the control signal for controlling the LED lighting.

BRIEF DESCRIPTION OF THE DRAWINGS

The above objects, and other features and advantages of the present invention will become more apparent after a reading of the following detailed description taken in conjunction with the drawings, in which:

FIG. 2 shows a current waveform on the primary side and the secondary side of a transformer;

FIG. 3 is a timing diagram illustrating a method of controlling the driving of the transformer by way of feedback in the embodiment of FIG. 1;

FIG. 4 is a timing diagram illustrating a method of controlling the driving of the transformer in response to a control signal in the embodiment of FIG. 1; and FIG. 5 is a block diagram showing another exemplary embodiment of an LED lighting apparatus in accordance with the present invention.

DETAILED DESCRIPTION OF PREFERRED EMBODIMENTS

Figure 1:
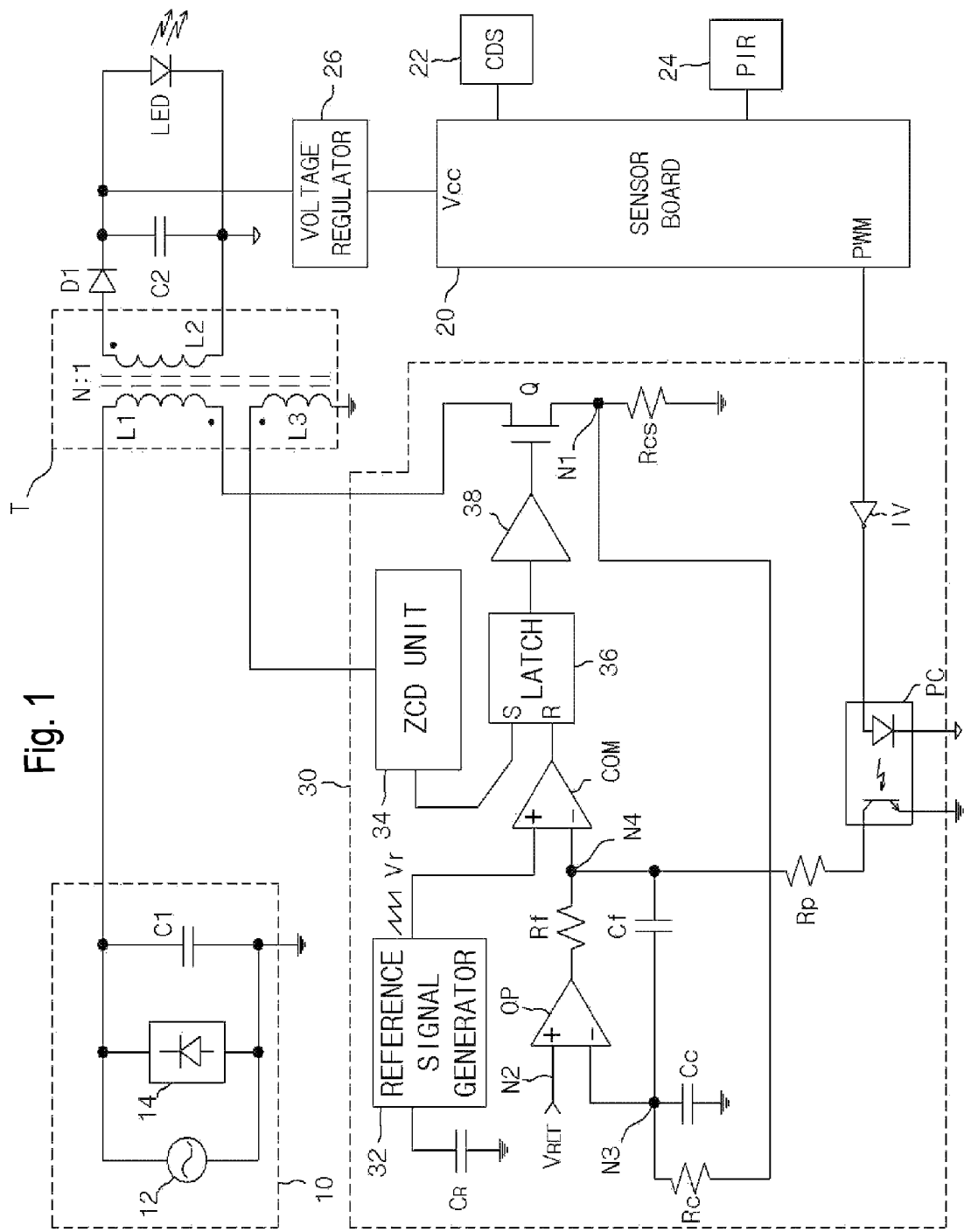
FIG. 1 is a circuit diagram showing an exemplary embodiment of an LED lighting apparatus in accordance with the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

An embodiment of the present invention has a structure having improved power efficiency because a power is driven using a current regulator 30.

Referring to FIG. 1, an LED lighting apparatus in accordance with an embodiment of the present invention includes a power source unit 10, a transformer T, a sensor board 20, and the current regulator 30.

The power source unit 10 is configured to perform full-wave rectification on AC power and output the results of the full-wave rectification as rectified voltage. That is, the power source unit 10 has a structure in which a power source 12, a rectification circuit 14, and a capacitor C1 are connected in parallel.

The power source 12 may use commercial power as AC power.

The rectification circuit 14 is configured to perform full-wave rectification on AC power of a sine waveform that is supplied by the power source 12 and output the results of the full-wave rectification as rectified voltage having a ripple component.

The capacitor C1 in parallel connected to the output terminal of the rectification circuit 14 functions to smooth the output of the rectification circuit 14.

The rectified voltage generated from the power source unit 10 is transferred to the transformer T. The transformer T is configured to transform an current according to the rectified voltage and output the transformed current. The transformer T in accordance with an embodiment of the present invention is an example of a converter for converting a level of voltage and may be a Buck type converter.

The transformer may include an inductor (not shown).

That is, the transformer T is configured to include a coil that forms a primary side L1, a coil that forms a secondary side L2, and an auxiliary coil L3. A winding ratio of the coils of the primary side L1 and the secondary side L2 may be set to N:1. The auxiliary coil L3 may have various winding ratios depending on an intention of a manufacturer. In general, the auxiliary coil L3 may have a winding ratio for inducing an current into a level capable of providing the operating voltage of the current regulator 30.

In accordance with the aforementioned construction, the transformer T has a construction in which an induction current is generated in the secondary side L2 by way of a current flow of the primary side L1 to which the rectified voltage is applied and the induction current of the secondary side L2 is rectified, smoothed, and transformed into DC voltage through a diode D1 and a capacitor C2 and is then outputted.

The transformer T also induces an current in the auxiliary coil L3 by way of the flow of current on the primary side L1.

The transformer T is driven by the current regulator 30.

The output of the transformer T is supplied to an LED lighting LED and the sensor board 20.

Voltage for driving the LED lighting LED and an operating voltage Vcc for the operation of the sensor board 20 have different levels. Accordingly, the output of the transformer T can be regulated by a voltage regulator 26 and provided as the operating voltage Vcc of the sensor board 20. The voltage regulator 26 has been illustrated as being configured an additional element, but the voltage regulator 26 may be embedded in the sensor board 20 depending on an intention of a manufacturer.

The LED lighting LED may be configured to include one LED or two or more LEDs and preferably may be configured to have an array of a plurality of LEDs.

The LED lighting LED may be configured in a security light or a streetlamp. For example, the LED lighting LED may be installed in a crosswalk as an auxiliary lighting for illuminating the crosswalk.

The sensor board 20 illustrates one of peripheral circuit modules to which a power is supplied.

The peripheral circuit modules may include a variety of devices to which a power source is supplied, such as the sensor board 20 for controlling the dimming or on and off of the LED lighting LED and a communication module.

The sensor board 20 may be configured to include a visible sensor CDS 22 and an infrared sensor PIR 24. The visible sensor 22 senses surrounding brightness (illuminance), and the infrared sensor 24 senses the human body.

The sensor board 20 may be configured to receive the operating voltage Vcc obtained by regulating the output of the secondary side L2 of the transformer T through the voltage regulator 26 and output a control signal. The control signal can be supplied as an analog signal or a control signal PWM.

The control signal PWM may have a pulse width changed for dimming control, and thus the control signal PWM having a changed pulse width can be outputted. Furthermore, if the control signal PWM is outputted with a duty of less than 10%, the control signal PWM may be defined to turn off the LED lighting LED.

Meanwhile, the current regulator 30 is configured to generate a driving pulse having a pulse width varied in response to the external control signal PWM and the amount of current on the primary side L1 of the transformer T and provide the generated driving pulse for the switching operation of the transformer T.

More particularly, the current regulator 30 may be configured to include a switching element Q, a feedback circuit, a dimming control circuit, a reference signal generator 32, a comparator COM, and a driving circuit.

The switching element Q is a power transistor which may be an FET and is connected to the primary side L1 of the transformer T. A driving pulse is applied to the gate of the switching element Q, and the switching element Q is switched in response to the driving pulse.

The feedback circuit is configured to apply a feedback signal, corresponding to an current flowing through the switching element Q, to the first comparison terminal (i.e., the negative terminal (−)) of the comparator COM.

More particularly, the feedback circuit includes a sensing resistor Rcs coupled between the switching element Q and the ground and configured to detect an current flowing through the switching element Q and a comparison circuit configured to compare voltage detected by the sensing resistor Rcs with a predetermined reference voltage $V_{REF}$ and apply a feedback signal to the first comparison terminal (i.e., the negative terminal (−)) of the comparator COM.

The comparison circuit of the feedback circuit includes a first filter resistor Rc, a first filter capacitor Cc, a comparator OP, a second filter resistor Rf, and a second filter capacitor Cf. The first filter resistor Rc and the first filter capacitor Cc operate as an input filter, and the second filter resistor Rf and the second filter capacitor Cf operate as an output filter.

That is, the input filter includes the first filter resistor Rc and the first filter capacitor Cc connected in parallel and transfers voltage, detected by the sensing resistor Rcs, to the negative terminal (−) of the comparator OP through the first filter resistor Rc.

The comparator OP compares voltage, applied to the negative terminal (−) through the first filter resistor Rc, with the reference voltage $V_{REF}$ applied to the positive terminal (+) of the comparator OP and outputs a result of the comparison.

The output filter includes the second filter resistor Rf and the second filter capacitor Cf connected in parallel and transfers the output signal of the comparator OP to the first comparison terminal (i.e., the negative terminal (−)) of the comparator COM through the second filter resistor Rf as a feedback signal.

The reference voltage $V_{REF}$ applied to the positive terminal (+) of the comparator OP has a value set by a manufacturer, which maintains the amount of current on the primary side L1 of the transformer T to a constant level.

The dimming control circuit is configured to apply a dimming control signal, corresponding to the control signal PWM generated from the sensor board 20 configured as a peripheral circuit module, to the first comparison terminal (i.e., the negative terminal (−)) of the comparator COM.

To this end, the dimming control circuit includes a photo coupler PC and a transfer resistor Rp. The photo coupler PC is configured to include a photo diode and a photo transistor therein. The photo coupler PC is configured to switch the photo transistor in response to a state in which the photo diode emits light in response to the control signal PWM generated from the sensor board 20 and thus transfer the control signal PWM to the transfer resistor Rp.

The transfer resistor Rp is configured to apply the output of the photo coupler PC to the first comparison terminal (i.e., the negative terminal (−)) of the comparator COM. Here, a signal applied to the transfer resistor Rp is smoothed by the second filter capacitor $C_F$, thus becoming a dimming control signal having a DC level. The dimming control signal is applied to the first comparison terminal (i.e., the negative terminal (−)) of the comparator COM.

Meanwhile, the reference signal generator 32 is configured to generate a reference pulse and apply the reference pulse to the second comparison terminal (i.e., the positive terminal (+)) of the comparator COM. A capacitor $C_R$ provides capacitance for the oscillation of the reference pulse. Furthermore, the reference pulse may be provided as a sawtooth wave pulse.

Furthermore, the comparator COM outputs a comparison signal, that is, a result of comparison between a signal applied to the first comparison terminal (i.e., the negative terminal (−)) and a signal applied to the second comparison terminal (i.e., the positive terminal (+)).

The driving circuit is configured to drive a pulse in response to the comparison signal generated from the comparator COM and apply the driving pulse to the switching element Q.

More particularly, the driving circuit includes a Zero Current Detection (ZCD) unit 34, a latch 36, and a driver 38.

The ZCD unit 34 receives the output current of the auxiliary coil L3 of the transformer T in order to detect a zero current point Z of an current that is induced into the secondary side L2 of the transformer T.

The ZCD unit 34 is configured to output a Zero Current Detection (ZCD) signal that is a result of the detection of a zero current point (refer to Z in FIGS. 2 and 3) of an current induced into the secondary side L2 of the transformer T, that is, the output current of the auxiliary coil L3.

Referring to FIG. 2, when the switching element Q is turned on, an current on the primary side L1 of the transformer T slowly rises. At this time, an induction current is not formed in the secondary side L2.

When the switching element Q is turned off, the flow of current on the primary side L1 of the transformer T is suddenly blocked, and an induction current is formed in the secondary side L2 and then gradually reduced.

The zero current point Z means a point of time at which the induction current on the secondary side L2 of the transformer T disappears, that is, a point of time at which the induction current becomes a zero state.

When the zero current point Z is reached, the flow of current on the primary side L1 of the transformer T is increased by the turn-on of the switching element Q.

That is, the flow of current on the primary side L1 of the transformer T is initiated in synchronization with the zero current point Z, thereby being capable of reducing a switching loss and improving total transform efficiency.

Meanwhile, the latch 36 preferably may have an RF flip-flop including a reset terminal R and a set terminal S. The latch 36 receives the ZCD signal through the set terminal S as a set signal and receives the comparison signal from the comparator COM through the reset terminal R as a reset signal. Furthermore, the latch 36 outputs a latch signal that remains enabled until the set signal is reset in response to the reset signal after the set signal is enabled.

The driver 38 drives the latch signal and transfers the latch signal to the switching element Q as a driving pulse. The driver 38 may include an amplification circuit having a buffer function, for example.

In the LED lighting apparatus in accordance with the embodiment of the present invention, the transformer T is driven in conjunction with the on and off of the switching element Q that is switched in response to the driving pulse.

The transformer T transforms rectified power applied to the primary side L1 and outputs the transformed power in such a manner that when the switching element Q is turned on, an electric current on the primary side L1 rises, and when the switching element Q is turned off, an induction current is formed in the secondary side L2 and decreased, as shown in FIG. 2.

The induction current outputted to the secondary side L2 of the transformer T is transformed into DC voltage through the diode D1 and the capacitor C2. The DC voltage is supplied to the LED lighting LED and the sensor board 20.

The driving pulse applied to the switching element Q as described above can be generated using the reference pulse.

The comparator COM compares a signal, received through the negative terminal (−), with a reference pulse Vr received from the reference signal generator 32 through the positive terminal (+) and outputs a result of the comparison as a comparison signal.

The feedback signal transferred through the comparator OP or the dimming control signal transferred through the photo coupler PC can be applied to the negative terminal (−) of the comparator COM so that the feedback signal has a DC level.

Accordingly, the comparator COM outputs a comparison signal whose high and low states alternate in response to the reference pulse Vr applied to the positive terminal (+) that alternately has high and low states on the basis of a DC level applied to the negative terminal (−).

The comparison signal generated from the comparator COM is applied to the reset terminal R of the latch 36.

The ZCD signal of the ZCD unit 34 is applied to the set terminal S of the latch 36.

The latch 36 outputs a pulse that maintains an enable state until the ZCD signal applied to the set terminal S is reset in response to the comparison signal of the comparator COM that is applied through the reset terminal R after the ZCD signal is enabled.

The driver 38 drives the latch signal received from the latch 36 and applies the resulting latch signal to the switching element Q as the driving pulse.

The LED lighting apparatus driven as described above in accordance with the embodiment of the present invention has a feedback function for uniformly maintaining a level of an electric current generated from the transformer T so that the LED lighting LED can emit light while maintaining constant brightness.

The feedback function can be performed in synchronization with a change of a level of the feedback signal that is applied to the negative terminal (−) of the comparator COM. That is, the driving of the transformer T can be controlled by the amount of current on the primary side L1 of the transformer T.

The sensing resistor Rcs included in the feedback circuit for the feedback function receives an current flowing through the primary side L1 of the transformer T through the switching element Q.

Voltage formed in the sensing resistor Rcs is inputted to the negative terminal (−) of the comparator OP through the input filter formed of the first filter resistor Rc and the first filter capacitor Cc.

The comparator OP compares the voltage at the negative terminal (−) with a set reference voltage $V_{REF}$ and outputs a result of the comparison in order to uniformly maintain the brightness of the LED lighting LED.

If the amount of current on the primary side L1 of the transformer T is small, the brightness of the LED lighting LED is dark, and if the amount of current on the primary side L1 of the transformer T is great, the brightness of the LED lighting LED is bright.

If a small amount of current is sensed by the sensing resistor Rcs because the brightness of the LED lighting LED is dark, a voltage level of a signal applied to the negative terminal (−) of the comparator OP is low. In such a case, the comparator OP outputs a signal Vop having a level Va in FIG. 3 because voltage having a lower level than the reference voltage $V_{REF}$ of the positive terminal (+) is applied to the negative terminal (−).

If a large amount of current is sensed by the sensing resistor Rcs because the brightness of the LED lighting LED is bright, a voltage level of a signal applied to the negative terminal (−) of the comparator OP is high. In such a case, the comparator OP outputs the signal Vop having a level Vb in FIG. 3 because voltage having a higher level than the reference voltage $V_{REF}$ of the positive terminal (+) is applied to the negative terminal (−).

The output of the comparator OP is applied to the negative terminal (−) of the comparator COM through the second filter resistor Rf as a feedback signal.

The reference pulse Vr generated from the reference signal generator 32 is applied to the positive terminal (+) of the comparator COM as shown in FIG. 3.

The comparator COM compares the feedback signal of the negative terminal (−) with the reference pulse Vr of the positive terminal (+) and outputs a comparison signal $V_{COM}$, that is, a result of the comparison, as shown in FIG. 3.

The comparator COM outputs the comparison signal $V_{COM}$ having a narrow pulse width in response to the feedback signal corresponding to a case where the brightness of the LED lighting LED is dark. On the contrary, the comparator COM outputs the comparison signal $V_{COM}$ having a wide pulse width in response to the feedback signal corresponding to a case where the brightness of the LED lighting LED is bright.

The comparison signal $V_{COM}$ is applied to the reset terminal R of the latch 36. The latch 36 outputs a latch signal in response to a ZCD signal, that is, the set signal applied to the set terminal S, and the comparison signal $V_{COM}$, that is, the reset signal applied to the reset terminal R.

The latch 36 is enabled starting from the zero current point Z in response to the ZCD signal generated from the ZCD unit 34 and is disabled starting from a point of time at which the comparison signal $V_{COM}$, that is, the reset signal, is enabled. That is, the latch 36 performs an RF flip-flop operation for outputting the latch signal that maintains an enable state from a point of time at which the set signal is enabled to a point of time at which the reset signal is enabled.

As a result, as shown in FIG. 3, the latch 36 outputs a latch signal VQL having a wide pulse width if the brightness of the LED lighting LED is dark. On the contrary, the latch 36 outputs a latch signal VQH having a narrow pulse width if the brightness of the LED lighting LED is bright.

Accordingly, the driver 38 drives a driving pulse having a wide pulse width if the brightness of the LED lighting LED is dark and supplies the driving pulse to the switching element Q. On the contrary, the driver 38 drives a driving pulse having a narrow pulse width if the brightness of the LED lighting LED is dark and supplies the driving pulse to the switching element Q.

Accordingly, if the brightness of the LED lighting LED is dark, the amount of current driven by the transformer T is increased because the switching element Q that is taken to be turned on is increased in response to the driving pulse having a wide pulse width. As a result, the brightness of the LED lighting LED becomes bright because the amount of current transformed by the transformer T is increased.

Furthermore, if the brightness of the LED lighting LED is bright, the amount of current driven by the transformer T is decreased because the switching element Q that is taken to be turned on is decreased in response to the driving pulse having a narrow pulse width. As a result, the brightness of the LED lighting LED becomes dark because the amount of current transformed by the transformer T is decreased.

The LED lighting LED can maintain regular brightness in accordance with the aforementioned feedback function.

Furthermore, the LED lighting apparatus in accordance with an embodiment of the present invention has a dimming control function for controlling the brightness of the LED lighting LED in response to the control signal PWM generated from the sensor board 20.

The sensor board 20 may be configured to output the control signal PWM having a pulse width varied in response to a case where external illuminance is bright and a case where external illuminance is dark using the visible sensor 22.

For example, if external illuminance is bright as a result of sensing by the visible sensor 22, the sensor board 20 may output the control signal PWM having a narrow pulse width. If external illuminance is dark as a result of sensing by the visible sensor 22, the sensor board 20 may output the control signal PWM having a narrow pulse width.

Furthermore, the sensor board 20 may be configured to output the control signal PWM having a pulse width for turning on or off the LED lighting LED in response to a case where a person is present and a case where a person is not present using the infrared sensor 24.

The turn-off of the LED lighting LED may be set on the basis of the time when the control signal PWM has a pulse width of a specific level or lower. For example, if a pulse width, that is, a duty ratio, of the control signal PWM is less than 10%, the LED lighting LED may be set to be turned off. In such a case, if the duty ratio of the control signal PWM is less than 10%, the LED lighting LED is not turned off by a power source supplied by the transformer T.

The operating voltage Vcc for the operation of the sensor board 20 may continue to be supplied because the transformer T outputs DC voltage having a level lower than a level that turns on the LED lighting LED although the LED lighting LED is turned off.

The dimming control function is described below with reference to FIG. 4.

The photo coupler PC included in the dimming control circuit for the dimming control function receives the control signal PWM from the sensor board 20.

If external illuminance is dark, the sensor board 20 may output the control signal PWM having a narrow pulse width, such as a pulse PWM1 of FIG. 4, in order to make bright the LED lighting LED. On the contrary, if external illuminance is bright, the sensor board 20 may output the control signal PWM having a wide pulse width, such as a pulse PWM2 of FIG. 4, in order to make dark the LED lighting LED.

The control signal PWM generated from the sensor board 20 passes through an inverter IV for inverting a level of the signal via the photo coupler PC, and then the signal is transformed into a dimming control signal Vpc having a DC component by means of the smoothing of the resistor Rp and the second filter capacitor Cf.

If external illuminance is dark, the dimming control signal Vpc having a high level, such as V1 of FIG. 4, is applied to the negative terminal (−) of the comparator COM. On the contrary, if external illuminance is dark, the dimming control signal Vpc having a low level, such as V2 of FIG. 4, is applied to the negative terminal (−) of the comparator COM.

The reference pulse Vr generated from the reference signal generator 32, such as that of FIG. 4, is applied to the positive terminal (+) of the comparator COM.

The comparator COM compares the dimming control signal Vpc of the negative terminal (−) with the reference pulse Vr of the positive terminal (+) and outputs the comparison signal $V_{COM}$, such as that of FIG. 4.

Here, the comparator COM outputs the comparison signal $V_{COM}$ having a narrow pulse width in response to the dimming control signal Vpc corresponding to a case where external illuminance is dark. On the contrary, the comparator COM outputs the comparison signal $V_{COM}$ having a wide pulse width in response to the dimming control signal Vpc corresponding to a case where external illuminance is bright.

The comparison signal VCOM is applied to the reset terminal R of the latch 36.

The latch 36 outputs the latch signal in response to the ZCD signal, that is, the set signal applied to the set terminal S, and the comparison signal $V_{COM}$, that is, the reset signal applied to the reset terminal R.

The latch 36 is enabled starting from a zero current point Z in response to the ZCD signal generated from the ZCD unit 34 and is disabled at a point of time at which the comparison signal $V_{COM}$, that is, the reset signal, is enabled. That is, the latch 36 performs an RF flip-flop operation for outputting a latch signal that maintains an enable state from a point of time at which the set signal is enabled to a point of time at which the reset signal is enabled.

As a result, as shown in FIG. 4, the latch 36 outputs a latch signal VQ1 having a wide pulse width if external illuminance is dark and outputs a latch signal VQ2 having a narrow pulse width if external illuminance is bright.

Accordingly, if external illuminance is dark, the driver 38 drives a driving pulse having a wide pulse width and supplies the driving pulse to the switching element Q. Accordingly, the brightness of the LED lighting LED becomes bright because the amount of current driven by the transformer T is increased.

On the contrary, if external illuminance is bright, the driver 38 drives a driving pulse having a narrow pulse width and supplies the driving pulse to the switching element Q. Accordingly, the brightness of the LED lighting LED becomes dark because the amount of current driven by the transformer T is decreased.

The brightness of the LED lighting LED can be controlled depending on surrounding illuminance through the aforementioned dimming control function.

Meanwhile, the on and off of the LED lighting LED can be controlled by the dimming control function in response to a case where a person is present and a case where a person is not present using the infrared sensor 24.

That is, if a person is not sensed by the infrared sensor 24, the sensor board 20 outputs the control signal PWM having a duty ratio of less than 10%. The pulse width of a driving pulse is reduced to a specific level or lower in response to the control signal PWM. As a result, the transformer T outputs DC voltage having a level that is insufficient to turn on the LED lighting LED.

That is, the LED lighting LED is turned off, and the transformer T performs an operation for transforming rectified voltage into DC voltage having a level that provides the operating voltage Vcc of the sensor board 20.

The LED lighting apparatus in accordance with an embodiment of the present invention has a structure in which the current regulator 30 drives AC power and supplies the AC voltage to the LED lighting LED and peripheral circuit modules, such as the sensor board 20.

Accordingly, in the LED lighting apparatus in accordance with an embodiment of the present invention, a construction for supplying a power source to the LED lighting LED and the peripheral circuit modules can be designed simply.

Furthermore, if the current regulator 30 in accordance with the present invention is designed to have power efficiency of 90%, the LED lighting apparatus in accordance with the present invention has total power efficiency of 90% without a change of power efficiency.

That is, since a power is transformed by only the current regulator 30 without experiencing several steps and supplied to the LED lighting LED and the peripheral circuit modules, the LED lighting apparatus of the present invention has improved power efficiency according to a design level of the current regulator 30.

Furthermore, the LED lighting apparatus in accordance with an embodiment of the present invention is configured to sense the amount of current on the primary side L1 of the transformer T and performs feedback for maintaining the amount of current on the primary side L1 of the transformer T in response to the sensed amount of current. That is, the LED lighting apparatus in accordance with an embodiment of the present invention has a function of controlling its output using the current regulator 30.

Furthermore, the LED lighting apparatus in accordance with an embodiment of the present invention has a characteristic in which the feedback operation and the dimming control operation are stably implemented in an overlapping way.

The node N1 of the sensing resistor Rcs, a node N2 connected to the positive terminal (+) of the comparator OP, or a node N3 connected to the negative terminal (−) of the comparator OP may be taken into consideration as a node for dimming control is supplied.

The node N1 of the sensing resistor Rcs is problematic in that it is difficult to control for dimming control and linearity is not secured because a resistance value at the sensing resistor Rcs is too low and it is also difficult to lower an output voltage until the LED lighting LED is turned off.

Furthermore, the node N2 connected to positive terminal (+) of the comparator OP can be controlled in order to guarantee linearity to some extent.

However, high voltage needs to be supplied to the node N2 in a duty of the control signal PWM having an off level of the LED lighting LED that corresponds to a level much lower than that of the reference voltage $V_{REF}$.

In such a case, it is determined that an output current on the feedback circuit continues to be lower than a control target owing to the high voltage inputted to the node N2. The comparator OP that operates as an error amplifier in conjunction with the feedback circuit increases voltage in order to increase the driving current of the switching element Q.

As a result, since a function for over current protection is performed, it is difficult to apply the control signal for dimming control to the node N2.

Furthermore, the node N2 connected to the positive terminal (+) of the comparator OP is a part from which the reference voltage $V_{REF}$ that is internally the most stable and precise needs to be generated.

Accordingly, if the control signal PWM, that is, an external input signal, is overlappingly applied to the node N2 connected to the positive terminal (+) of the comparator OP, the node N2 becomes vulnerable to external disturbance. Furthermore, if the current regulator 30 is formed into a chip, the node N2 must be exposed to the outside using an additional terminal.

In accordance with an embodiment of the present invention, the control signal PWM for dimming control is applied to the negative terminal (−) of the comparator COM.

In general, the first filter capacitor Cc and the second filter capacitor Cf are configured to be exposed outside an integrated circuit. The control signal PWM can be easily applied to the negative terminal (−) of the comparator COM in an overlapping way because the first filter capacitor Cc and the second filter capacitor Cf have high impedance to some extent.

Furthermore, the negative terminal (−) of the comparator COM has excellent linearity according to a change, and a level of a signal inputted to the negative terminal (−) of the comparator COM for the output of the comparator COM is changed.

Accordingly, although a duty of the control signal PWM is lowered up to an off level of the LED lighting LED, the feedback circuit can operate normally.

The LED lighting apparatus of the present invention may be configured to efficiently supply a power source to a communication module 120 and peripheral circuits for controlling a plurality of LED lightings LED spaced apart from one another, such as security lights or streetlamps, as shown in FIG. 5.

Each of the LED lightings LED includes a current regulation module 100 including the power source unit 10, the transformer T, and the current regulator 30 according to the embodiment of FIG. 1. The current regulation module 100 transforms AC power, that is, commercial power, and supplies the power to the LED lighting LED as in the operation described with reference to FIG. 1.

In the embodiment of FIG. 5, one communication module 120 is configured in the plurality of current regulation modules 100 including the respective LED lightings LED, and the communication module 120 supplies a control signal to each of the current regulation modules 100. Furthermore, the communication module 120 receives a power from one specific current regulation module 100.

The communication module 120 can control the dimming or on and off states of the LED lightings LED at once. That is, the plurality of LED lightings LED can be controlled so that they maintain the same dimming state or the same on or off state.

In the embodiment of the present invention shown in FIG. 5, one specific current regulation module 100 configured to supply a power to the LED lighting LED is configured to supply DC power to the communication module 120.

Accordingly, there are advantages in that a control block for on and off control or dimming control does not need to be installed in each LED lighting LED and a circuit for supplying a power to each control block does not need to be configured.

Furthermore, the embodiment of FIG. 5 is advantageous in that total power efficiency of the LED lighting apparatus for driving the plurality of LED lightings LEDs can be improved because power efficiency can be improved by the current regulation modules 100 as in the embodiment of FIG. 1.

As is apparent from the above description, the present invention has an advantage in that the LED lighting apparatus can be designed to have high power efficiency because the current regulator is configured to transform AC power and supply a power to the LED lighting apparatus.

Furthermore, the present invention has an advantage in that the LED lighting apparatus can be implemented to have a simple structure because the current regulator is configured to supply a power to peripheral circuit modules, such as the sensor board and the communication module, in addition to the LED lighting.

Furthermore, the present invention has an advantage in that total power efficiency can be improved because the current regulator can supply a power to the LED lighting and peripheral circuit modules.

Furthermore, the present invention has an advantage in that a power can be efficiently supplied to a peripheral circuit module, such as a communication module for controlling a plurality of LED lightings spaced apart from one another, such as security lights or streetlamps.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. An LED lighting apparatus, comprising:
   a converter for outputting a DC voltage obtained by converting a rectified voltage through a switching operation according to a driving pulse;
   an LED lighting for emitting light using the DC voltage;
   a current regulator for comparing a reference pulse to a signal obtained by adding up a feedback signal corresponding to a current flowing through the converter by the switching operation according to the driving pulse and a dimming control signal corresponding to a control signal of a peripheral circuit module, generating the driving pulse having a variable pulse width as the comparison result, and switching an operation of the converter using the driving pulse; and
   the peripheral circuit module for simultaneously receiving the DC voltage for the LED lighting, operating according to an operating voltage obtained by regulating the DC voltage, and providing the control signal for controlling dimming of the LED lighting, wherein the peripheral circuit module includes a sensor for sensing an exterior environment, and the control signal having a pulse width varied with a result of the sensing by the sensor.

2. The LED lighting apparatus of claim 1, wherein the converter comprises an inductor or a transformer.

3. The LED lighting apparatus of claim 1, wherein the current regulator comprises:
   a switching element connected to the converter and configured to be switched in response to the driving pulse;
   a feedback circuit configured to supply a first comparison terminal with a feedback signal corresponding to current that flows through the switching element;
   a dimming control circuit configured to supply the first comparison terminal with a dimming control signal corresponding to the control signal of the peripheral circuit module;
   a reference signal generator configured to generate a reference pulse and supply the reference pulse to a second comparison terminal;
   a first comparator configured to output a comparison signal obtained by comparing the signals of the first and the second comparison terminals with each other; and
   a driving circuit configured to drive a pulse in response to the comparison signal and supply the driving pulse to the switching element.

4. The LED lighting apparatus of claim 3, wherein the feedback circuit comprises:
   a sensing resistor configured to detect current of the switching element; and
   a comparison circuit configured to compare voltage, detected by the sensing resistor, with a predetermined reference voltage and to supply the feedback signal to the first comparison terminal.

5. The LED lighting apparatus of claim 4, wherein the comparison circuit comprises:
   an input filter configured to comprise a first filter resistor and a first filter capacitor connected in parallel and transfer the voltage detected by the sensing resistor through the first filter resistor;
   a second comparator configured to compare voltage, applied to a negative terminal of the second comparator through the first filter resistor, with the reference voltage applied to a positive terminal of the second comparator and to output a result of the comparison; and
   an output filter configured to comprise a second filter resistor and a second filter capacitor connected in parallel and to transfer the output signal of the second comparator to the first comparison terminal of the first comparator through the second filter resistor as the feedback signal.

6. The LED lighting apparatus of claim 3, wherein the dimming control circuit comprises:
   a photo coupler configured to transfer the control signal; and
   a transfer resistor configured to apply output of the photo coupler to the first comparison terminal.

7. The LED lighting apparatus of claim 3, wherein the driving circuit comprises:
   a Zero Current Detection (ZCD) unit configured to output a ZCD signal obtained by detecting a zero current point of the current of the converter;
   a latch configured to receive the ZCD signal as a set signal and the output of the first comparator as a reset signal and to output a latch signal that remains enabled until the latch signal is reset in response to the reset signal after the set signal is enabled; and
   a driver configured to drive the latch signal and to transfer the driven latch signal to the switching circuit as the driving pulse.

8. The LED lighting apparatus of claim 7, wherein:
   the converter comprises an auxiliary coil for outputting current in response to a change of current, and
   the ZCD unit outputs the output current of the auxiliary coil as the ZCD signal obtained by detecting the zero current point.

9. The LED lighting apparatus of claim 1, wherein the control signal is supplied as an analog signal or a PWM signal.

10. A current regulator for an LED lighting apparatus, comprising:
- a switching element connected to a converter for converting a level of voltage and configured to switch an operation of the converter in response to a driving pulse;
- a feedback circuit configured to supply a first comparison terminal with a feedback signal corresponding to current that flows through the switching element;
- a dimming signal transfer circuit configured to externally receive a control signal for controlling dimming of an LED lighting and to apply a dimming control signal corresponding to the control signal to the first comparison terminal;
- a reference signal generator configured to generate a reference pulse and to supply the reference pulse to the second comparison terminal;
- a first comparator configured to output a comparison signal obtained by comparing the signals of the first and the second comparison terminals with each other; and
- a driving circuit configured to supply the driving pulse to the switching element in response to the comparison signal.

11. The current regulator of claim 10, wherein the feedback circuit comprises:
- a sensing resistor configured to detect current of the switching element; and
- a comparison circuit configured to output the feedback signal, obtained by comparing voltage detected by the sensing resistor with a predetermined reference voltage, to the first comparison terminal.

12. The current regulator of claim 11, wherein the comparison circuit comprises:
- an input filter configured to comprise a first filter resistor and a first filter capacitor connected in parallel and to transfer the voltage detected by the sensing resistor through the first filter resistor;
- a second comparator configured to compare voltage, applied to a negative terminal of the second comparator through the first filter resistor, with the reference voltage applied to a positive terminal of the second comparator and to output a result of the comparison; and
- an output filter configured to comprise a second filter resistor and a second filter capacitor connected in parallel and to transfer the output signal of the second comparator to the first comparison terminal of the first comparator through the second filter resistor as the feedback signal.

13. The current regulator of claim 10, wherein the driving circuit comprises:
- a Zero Current Detection (ZCD) unit configured to output a ZCD signal obtained by detecting a zero current point of current of the converter;
- a latch configured to receive the ZCD signal as a set signal and the output of the first comparator as a reset signal and to output a latch signal that remains enabled until the latch signal is reset in response to the reset signal after the set signal is enabled; and
- a driver configured to drive the latch signal and to transfer the driven latch signal to the switching circuit as the driving pulse.

14. The current regulator of claim 13, wherein the ZCD unit detects the zero current point of the current of the converter as an output of an auxiliary coil for outputting current corresponding to a change of the current of the converter.

15. A current regulation method of an LED lighting apparatus, comprising:
- supplying, by a converter for converting a level of voltage through a switching element driven in response to a driving pulse, an LED lighting and one or more peripheral circuit modules with DC voltage, converted from rectified voltage, to as a power;
- detecting current of the converter;
- applying a current control signal, obtained by comparing the current of the converter with a reference voltage, to a first comparison terminal;
- applying a dimming control signal, corresponding to a control signal received outside the LED lighting, to the first comparison terminal;
- generating a reference pulse and applying the reference pulse to the second comparison terminal;
- comparing the signals of the first and the second comparison terminals with each other and outputting a result of the comparison as a comparison signal; and
- outputting the driving pulse using a Zero Current Detection signal obtained by detecting a zero crossing point of the current of the converter as a set signal and the comparison signal as a reset signal.

16. An LED lighting apparatus, comprising:
- a plurality of LED lightings spaced apart from one another;
- a plurality of current regulation modules installed in the plurality of LED lightings, respectively, and each configured to compare a reference pulse to a signal obtained by adding up a dimming control signal corresponding to an external control signal and a feedback signal corresponding to a current amount of a converter for converting the level of a voltage through a switching operation according to a driving pulse, generate the driving pulse having a variable pulse width as the comparison signal, and supply a DC voltage to the corresponding LED lighting among the plurality of LED lightings through the converter driven in response to the driving pulse; and
- a communication module configured to receive the DC voltage from a specific current regulation module among the plurality of current regulation modules at the same time as the LED lighting, operate using an operating voltage obtained by regulating the DC voltage, and provide the control signal for controlling the plurality of LED lightings, wherein the communication module includes a sensor for sensing an exterior environment, and the control signal having a pulse width varied with a result of the sensing by the sensor.

* * * * *